United States Patent
Gupta et al.

(10) Patent No.: US 12,517,924 B1
(45) Date of Patent: Jan. 6, 2026

(54) VERIFYING PERFORMANCE OF DIFFERENT REPLICATION TECHNIQUES FOR DATA SET PROJECTIONS

(71) Applicant: Amazon Technologies, Inc., Seattle, WA (US)

(72) Inventors: Amit Gupta, Redmond, WA (US); Vaibhav Jain, Bangalore (IN); Peter Zhivkov, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 173 days.

(21) Appl. No.: 17/491,293

(22) Filed: Sep. 30, 2021

(51) Int. Cl.
G06F 16/27 (2019.01)
G06F 16/22 (2019.01)
G06F 16/23 (2019.01)

(52) U.S. Cl.
CPC ........ G06F 16/273 (2019.01); G06F 16/2282 (2019.01); G06F 16/2379 (2019.01)

(58) Field of Classification Search
CPC . G06F 16/273; G06F 16/2282; G06F 16/2379
See application file for complete search history.

(56) References Cited

U.S. PATENT DOCUMENTS

| | | | | |
|---|---|---|---|---|
| 8,176,277 B2* | 5/2012 | Bricker | ................ | G06F 16/184 |
| | | | | 711/E12.103 |
| 8,495,019 B2* | 7/2013 | Shisheng | .............. | G06F 11/004 |
| | | | | 707/639 |
| 8,762,340 B2* | 6/2014 | Paksoy | ............... | G06F 16/2228 |
| | | | | 707/640 |
| 9,411,866 B2* | 8/2016 | Bartholomä | ............ | G06F 16/27 |
| 9,830,223 B1* | 11/2017 | Holenstein | .......... | G06F 11/1474 |
| 10,360,214 B2 | 7/2019 | Gold et al. | | |
| 10,379,966 B2* | 8/2019 | Gangadharappa | .. | G06F 11/0757 |
| 10,628,443 B2* | 4/2020 | Cantwell | ............... | H04L 41/145 |
| 10,783,073 B2* | 9/2020 | Gupta | ..................... | G06F 16/23 |
| 10,846,305 B2 | 11/2020 | Merriman et al. | | |
| 10,853,182 B1* | 12/2020 | Vig | ......................... | G06F 16/23 |
| 10,860,604 B1* | 12/2020 | Pandey | ............... | G06F 11/1402 |
| 10,963,456 B2* | 3/2021 | Arye | .................. | G06F 16/24539 |
| 11,157,512 B2* | 10/2021 | Kim | ...................... | G06F 16/258 |
| 11,176,140 B2* | 11/2021 | Martin | .................. | G06F 16/258 |
| 11,314,714 B2* | 4/2022 | Rice | ........................ | G06F 16/278 |
| 11,372,821 B2* | 6/2022 | Ganti | .................. | G06F 16/2452 |
| 2002/0174142 A1* | 11/2002 | Demers | ................ | G06F 16/213 |
| | | | | 707/E17.032 |
| 2007/0043749 A1* | 2/2007 | Gerber | ................ | G06F 11/2097 |
| 2008/0228783 A1* | 9/2008 | Moffat | .................... | G06F 16/29 |
| 2010/0030730 A1* | 2/2010 | Shang | .................... | G06F 16/27 |
| | | | | 707/637 |
| 2014/0181016 A1* | 6/2014 | Whitehead | .......... | G06F 11/2064 |
| | | | | 707/613 |

(Continued)

*Primary Examiner* — Miranda Le
(74) *Attorney, Agent, or Firm* — S. Scott Foster; Kowert, Hood, Munyon, Rankin & Goetzel, P.C.

(57) ABSTRACT

A data set may be replicated to another storage location according to a schema that projects a subset of the data set according to a replication technique. An additional replication technique, different from the first replication technique, that also projects a subset of the data set to a third storage location is performed. The correctness of the additional replication technique may be verified with regard to the data set to generate a performance report for the additional replication technique.

19 Claims, 9 Drawing Sheets

(56) References Cited

U.S. PATENT DOCUMENTS

| | | | |
|---|---|---|---|
| 2018/0203874 A1* | 7/2018 | Gkoufas | G06F 16/148 |
| 2019/0303010 A1* | 10/2019 | Meiri | G06F 3/0619 |
| 2020/0311025 A1* | 10/2020 | Singh | G06F 11/1004 |
| 2020/0320051 A1* | 10/2020 | Lee | G06F 16/278 |
| 2021/0081432 A1 | 3/2021 | Grunwald et al. | |

* cited by examiner

VERIFYING PERFORMANCE OF DIFFERENT REPLICATION TECHNIQUES FOR DATA SET PROJECTIONS

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. However, replicating different portions of the partitioned data can further increase the complexity and costs of propagating changes to the data to other data replicas. For example, projections or views of a partitioned database table may be separately maintained. Propagating changes to the projection or views may increase the costs of processing updates at the original partitions of the database table as the original partitions of the database table may need to ensure that the appropriate projections or views of the database table are updated.

Figure 1:
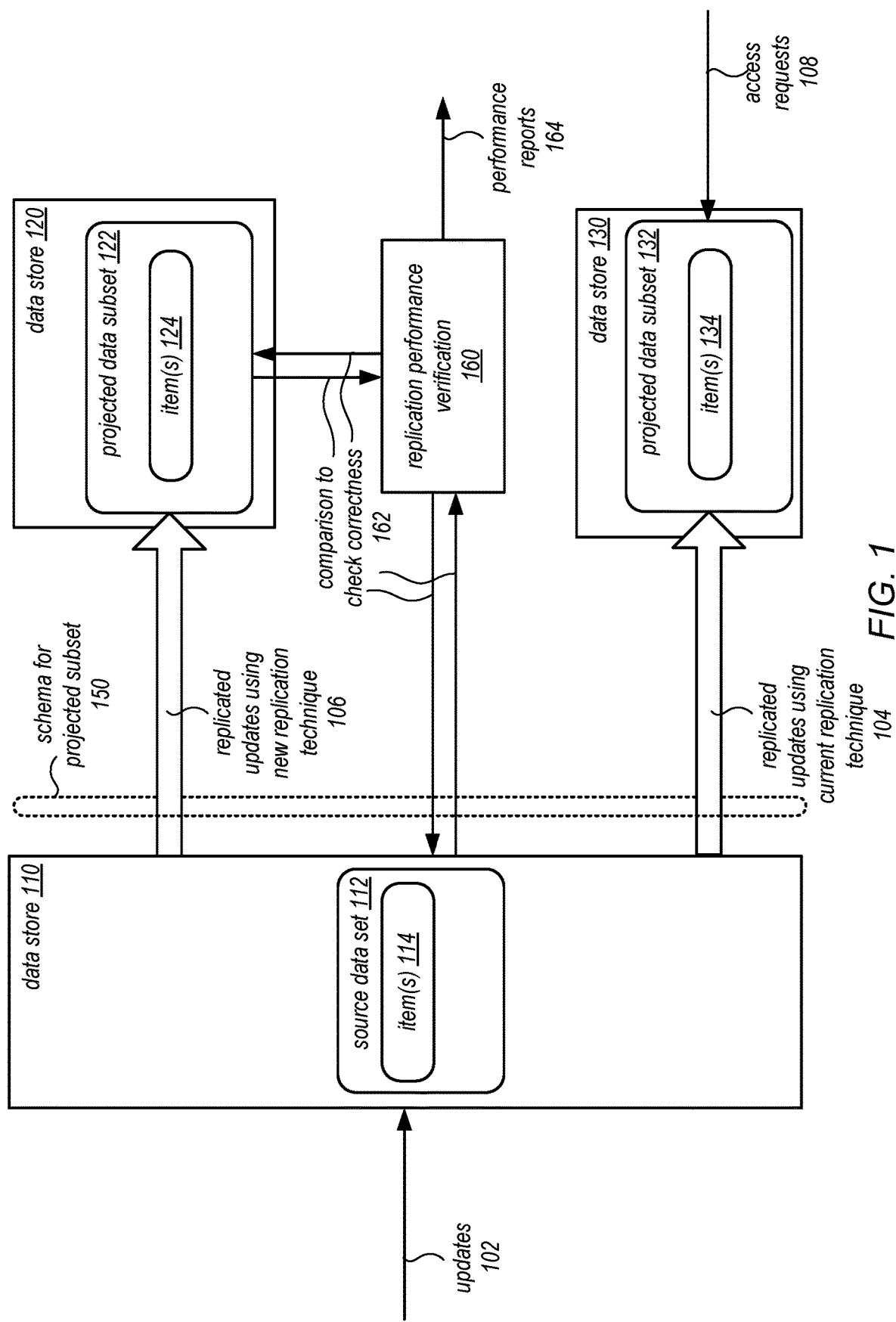
FIG. 1 is a logical block diagram illustrating verifying performance of different replication techniques for data set projections, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement verifying performance of different replication techniques for data set projections. Data sets may be distributed across one or more locations in a storage system, in some embodiments. In this way, clients can access and independently update different portions of the data set at the one or more locations in the storage system, in some embodiments. The arrangement of the data set may be optimal for some access requests (e.g., queries based on indexed fields or values in a table). However, to optimally process other access requests (e.g., queries based on non-indexed fields or values in a table), portions of the data set (or the entire data set) may be replicated in one or more other locations (e.g., a different storage nodes, systems, or hosts) in a different arrangement, subset, or format that is more performant for performing the other type of access request according to a schema that defines the different arrangement, subset, or format, in some embodiments.

For example, in some scenarios, locating items that have particular attributes may cause a scan across all (or a large number) of items in order to locate the items with the particular attributes. However, a projection of the data set defined by a schema can be used to identify those items with the particular attributes. The schema can be used to create the projection of the data set (e.g., as a secondary index), that provides an alternative data structure to search for items with those particular attribute values. For instance, a table that includes items for registered users may include a user identifier, which is unique and primary key for the item, along with a first name attribute, last name attribute, location attribute, and age attribute. A secondary index may be generated for the table which can index items according to other values than the key value pair, such as location and age. For example, the secondary index may be generated so that all items with same location attribute values are stored together according to age attribute value order. In this way, an access request for data that specifies a particular range of ages for a location may be quickly obtained without performing a scan of the entire table of items, as noted above. Other attribute values may also be defined by the schema and thus included in the projection, such as first and last name attribute values.

Instead of relying upon the resources of a source storage location for a data set to create new a new replica of a data set, such as a projected data subset like a secondary index as discussed below, techniques that index or otherwise determine which portions of a source data set to replicate to the new replica using other resources, such as a separate system component or node, may be implemented. Different replication techniques, such as different propagation architectures as discussed below with regard to FIGS. 2-5, may offer different performance advantages to maintaining projected data subsets.

Determining what those performance advantages are and determining whether a replication technique behaves as expected may be difficult to determine when systems or services like database service 210 discussed below with regard to FIG. 2, may have a large number of source data sets, projected data subsets, and different workloads of updating and accessing the different projected data subsets. For example, some use cases for a projected data subset may rely less upon consistency, but instead value speed to perform access requests to a project data subset quickly, whereas in other use cases consistency of the projected data subset with respect to source data sets may be more important. Different replication techniques may offer different performance characteristics regarding these and other performance concerns, both internal to a system implementing the data stores and data sets, and to clients that utilize them. Therefore, techniques that allow for verification to measure the performance of replication techniques may be highly desirable to improve or tailor replication for different scenarios. For example, a different propagation architecture could be used or selected for different clients of a database service so that the propagation architecture that provides a best performance for a client can be used.

FIG. 1 is a logical block diagram illustrating verifying performance of different replication techniques for data set projections, according to some embodiments. Source data set 112 may be a database table (or tables), or other set, collection, or grouping of data item(s) 114 that may be also stored in a second location, such as data stores 120 and 130, as projected data subsets 122 and 132. For example, as discussed in detail below with regard to FIGS. 2-5, source data set 112 may be one or more database tables and projected data subsets 122 and 132 may be secondary indexes (which may be sometimes referred to as global secondary indexes as the secondary index may be generated from distributed portions of a source table across different storage nodes and separately hosted from the source database tables as opposed to a local secondary index which may be generated only from data local (e.g., on a same host) and stored on that same host). Updates 102 may accepted and performed at data store 110 that are directed to source data set 112, which may be various types of actions, modifications, or changes to source data set 112 (e.g., insert new item(s) (or attributes of items), modify item(s), delete items (or attributes of items)). These updates may be performed in some ordering at data store 110. For example, updates 102 may be performed in a FIFO ordering where each update is performed as it is received.

In order to keep projected data subsets 122 and 132 consistent with a source data set 112, some of updates 102 may be replicated to data stores 120 and 130 to update projected data subsets 122 and 132 according to schema 150 for the projected data subset 132. For example, as noted above, items with certain attribute values may be replicated (e.g., a location attribute) that are specified by a schema whereas other attribute values (or items) may not be replicated. Thus, only some updates 102 may be replicated in some scenarios (though all or none of received updates may be replicated according to whether the schema 150 for the projected data subset 122 and 132 includes the items affected by the updates).

Different replication techniques, as indicted at 104 and 106 may be performed to update projected data subsets 122 and 132. For example, one current replication technique 104 may leverage different arrangements of nodes, protocols, and/or other operations to ensure replicated updates are passed and applied to projected data subset 132 that differs from a new replication technique 106. In order to understand the performance characteristics of the new replication technique, replication performance verification 160 may be implemented. Replication performance verification 160 may access items 124 in projected data subset 122 and items 114 in source data set 112 in order to compare them and check for correctness 162 in the projected data subset 132. If, for instance, an item 124 is incorrect with respect to information from item(s) 114, then replication performance verification 160 can generate and send a performance report 164 to indicate the error (and any other performance information, such as lag time between updates at source data set 112 and projected data subset 122).

In some embodiments, the techniques described above with regard to FIG. 1 may be implemented as part of a deployment or other management system to evaluate the use of a new replication technique prior to deploying the new replication technique. For example, it may be that only projected data set subset 132 can service access requests 108 (e.g., to read from a secondary index), whereas project data subset 122 may be hidden from client access requests. In some embodiments, the resources used to perform the new replication technique 106, store the projected data subset, and perform replication performance verification may not be made available and/or impact the performance of data store 110 and data store 130 for end users. For example, various workload management features, such as throttling updates 102 based on a replication technique's performance (e.g., by throttling the updates when a queue of updates to replicate exceeds some size threshold) may not be enforced based on the performance of replication technique 106. In this way, testing and verification can be performed prior to deployment without interrupting or degrading client performance on client-visible features, such as source data set 112 and projected data subset 132.

Please note that previous descriptions of a data store, data set, replication performance verification, and replication techniques are not intended to be limiting, but are merely provided as logical examples.

This specification begins with a general description of a provider network that may implement a database service that may implement verifying performance of different replication techniques for data set projections. Then various examples of a database service are discussed, including different components/modules, or arrangements of components/module, that may be employed as part of implementing the database service, in some embodiments. A number of different methods and techniques to implement verifying performance of different replication techniques for data set projections are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
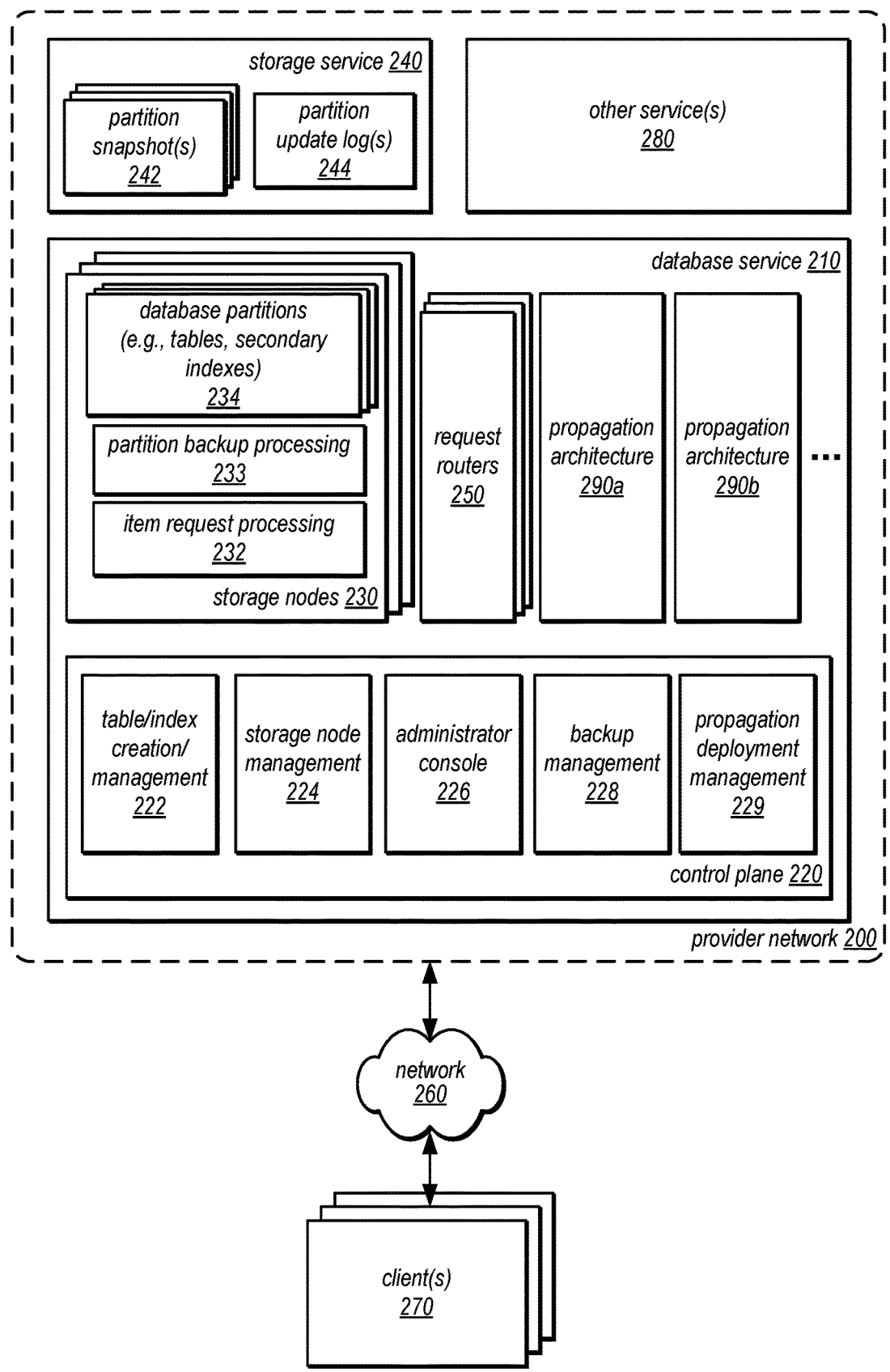
FIG. 2 is a logical block diagram illustrating a provider network offering a database service that may implement verifying performance of different replication techniques for secondary indexes, according to some embodiments.

FIG. 2 is a logical block diagram illustrating a provider network offering a database service that may implement verifying performance of different replication techniques for secondary indexes, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 9 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments. Database service 210 may implement different propagation architectures 290a, 290b, and son, discussed in detail below with regard to FIGS. 3-5, which may handle propagation sessions with storage nodes, manage hot partitions, retry logic, checkpointing, and various other operations to implement propagation of updates to a secondary index according to different replication techniques, as discussed above with regard to FIG. 1 and below with regard to FIGS. 6-7.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables, delete tables, create secondary indexes, etc., In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine)

may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management 228 may handle or manage the creation of backup requests to make copies as of a version or point-in-time of a database, as backup partitions 242 in storage service 240 which may be used to perform an offline build of a replicated data set like a secondary index.

Control plane 220 may implement propagation deployment management 229 which may perform various techniques to identify, enable, verify, and change to different propagation architectures 290. In some embodiments, different propagation architectures may represent different versions with different features as part of a development cycle for propagation (e.g., v1, v2, v3, etc.). In some embodiments, different propagation architectures may be selectable by a client 270 (e.g., via request to administrator console 226) in order to choose a propagation style that best fits their use of a secondary index. In some embodiments, propagation architectures 290 may not be visible to or selectable by clients. Propagation deployment management 229 may support the verification and change of propagation architectures 290, in some embodiments.

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model). In some embodiments, item request processing 232 may perform operations to update, store, and/or send an update replication log to a propagation architecture 290, as discussed below with regard to FIG. 3.

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more name-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups. Storage service 240 may implement striping, sharding, or other data distribution techniques so that different portions of a partition backup 242 are stored across multiple locations (e.g., at separate nodes). In various embodiments, storage nodes 230 may implement partition backup processing 233 to store partition snapshots 242 (e.g., by storing a copy of a partition 234 as of a point-in-time as a snapshot object 242 in storage service 240. In at least some embodiments, update logs 244 (e.g., created by updates for database partitions 234 by item request processing 232) may be stored as objects in storage service 240.

Figure 3:
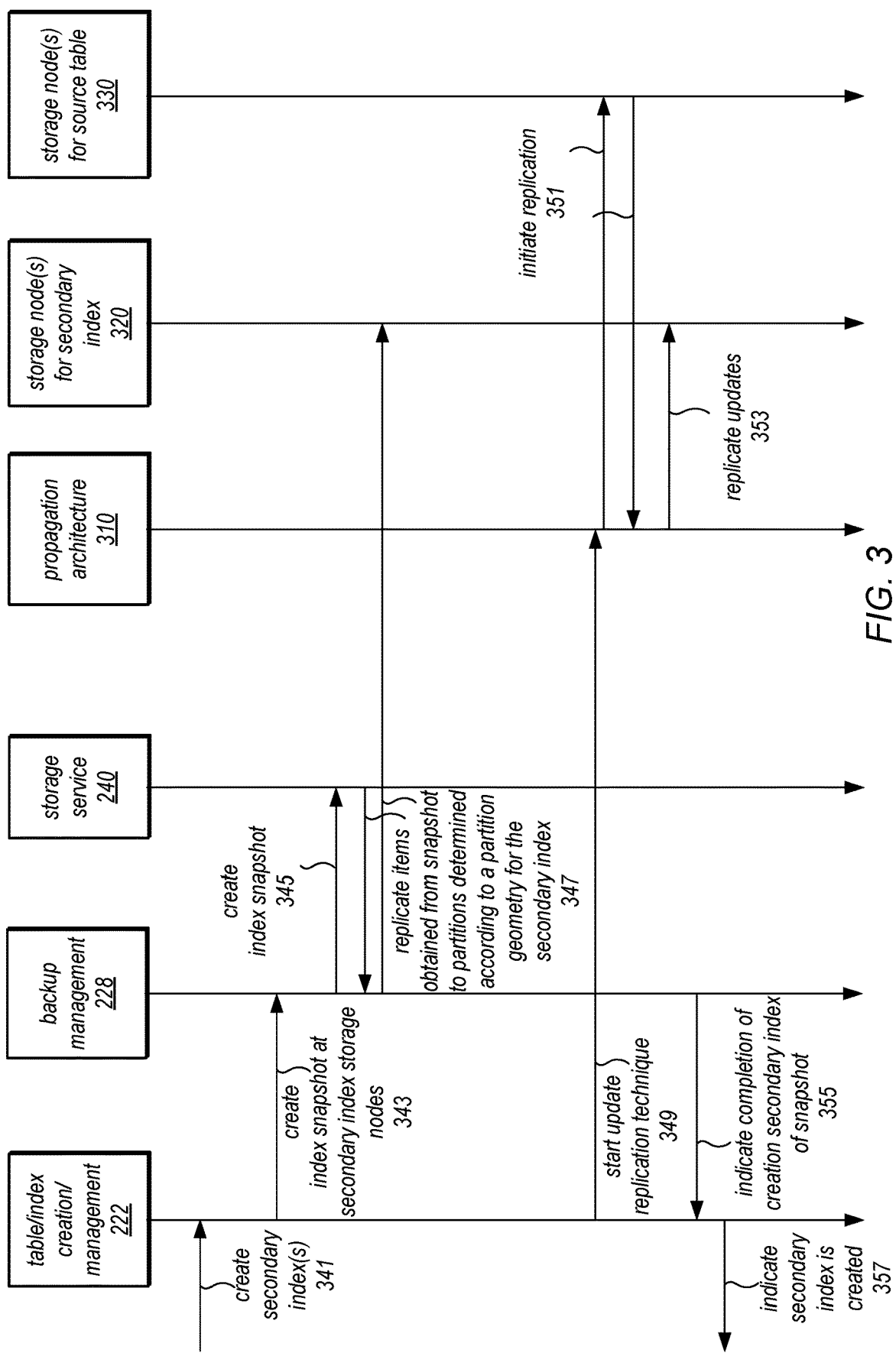
FIG. 3 is a logical block diagram illustrating interactions to perform offline index builds for secondary indexes in a database service using a propagation architecture, according to some embodiments.

FIG. 3 is a logical block diagram illustrating interactions to perform offline index builds for database tables in a database service, according to some embodiments. Table index creation management 222 may receive are request to create a secondary index (or multiple ones) as indicated 341. The request to create the secondary index may be received from a user (via a client) of database service 210 to create a secondary index for a database table and/or may be received from deployment management 229 which my create a new secondary index that is a copy of an existing secondary index in order to evaluate and eventually deploy a different propagation architecture, as discussed in detail below with regard to FIGS. 4 and 5.

Index creation management 222 may send a request to create an index snapshot at secondary index storage nodes 343 to backup management 228. Backup management 228 may perform an operation to create an index snapshot according (e.g., according to a creation timestamp) 345 to storage service 240. For example, a creation timestamp may occur after timestamp ordering is enabled for a source database table. In some embodiments, creation of the snapshot may include taking an already created snapshot and applying a log of updates also stored in storage service 240 (sometimes referred to as materialization) to bring the snapshot up to a state consistent with creation timestamp. In some embodiments, backup management 228 may create the index snapshot by applying the schema when creating the snapshot (e.g., arranging, excluding, or other operations as specified by the schema) so that the created index snapshot is a version of the secondary index consistent with the creation timestamp. In other embodiments, as noted below, backup management 228 may evaluate a created index snapshot to then determine what items to replicate.

Backup management 228 may then replicate items obtained from the snapshot using conditional operations 347 to different partitions determined according to a partition geometry for the secondary index at storage nodes for secondary index 320 that satisfy a schema for the secondary index. As discussed in detail below with regard to FIG. 8, a partition geometry may be used to define the different ranges of key values that can identify different partitions of a secondary index. The partition geometry may be created to optimize the performance of replicating items to the different partitions (e.g., ensuring that partitions do not exceed a partition number constraint and/or exceed a workload threshold for partitions. In some embodiments, backup management 228 may scan the created snapshot and evaluate each item with respect to the schema by issuing reads, scans, queries, or other various other access requests with respect to the items of the snapshot in storage service 240. Storage node(s) for secondary index 320 may be assigned to the secondary index by table/index creation/management 222 (not illustrated), in some embodiments.

Index creation management 222 may start replication using a selected propagation architecture 310 (e.g., different propagation nodes, protocols, and/or other techniques for propagating updates to a secondary index that is a projection of items from a source table according to a schema for the secondary index, which may identify what data and the arrangement of data to replicate from a source table into the secondary index). In some embodiments, propagation architecture 310 may be based on a log replication timestamp that may occur (in time) before the creation timestamp to create an overlap for the updates replicated from the update log and the version of the source database table in the created index snapshot. Propagation architecture 310 may initiate a replication 352 (e.g., using a replication stream from the log replication timestamp) from storage nodes 330 for the source table (which may send updates as a stream of log records). For example, storage nodes for source table 330 may determine what updates in an update log occur on or after the log replication timestamp and send them to propagation architecture 310. Propagation architecture 310 may replicate updates from with conditional operations 353 to storage nodes 320 that satisfy the schema for the secondary index. Some updates in the log stream, for instance, may not be specified for inclusion in the secondary index according to the schema and thus may be ignored or dropped.

Backup management 228 may provide an indication of completion from the snapshot 355 to table/index creation/ management 222, in various embodiments. For example, backup management 228 may determine that no more items are to be replicated from the snapshot and in response send completion of the creation of the secondary index from snapshot. Table/index creation/management 222 may provide an indication that the secondary index is created 357 to a client in response to the creation from snapshot 355, in some embodiments.

Figure 4:
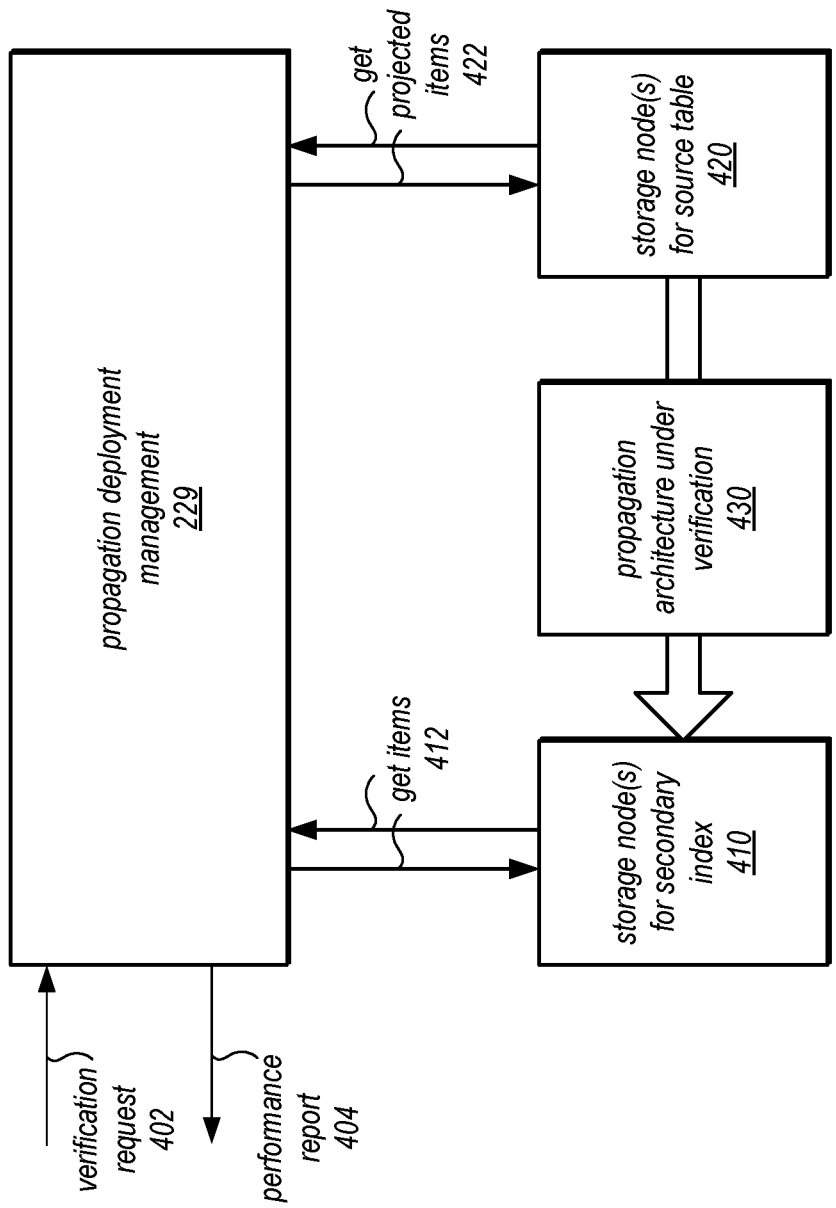
FIG. 4 is a logical block diagram illustrating verification of a propagation architecture for a secondary index by deployment management, according to some embodiments.

FIG. 4 is a logical block diagram illustrating verification of a replication architecture for a secondary index by deployment management, according to some embodiments. Propagation deployment management 229 may receive a verification request 402 (e.g., via an interface of database service 210, such as through administrator console 226), which may enable continuous verification (e.g., monitoring) and/or cause a single verification operation to be performed with respect to an identified propagation architecture, such as propagation architecture under verification 430. For example, storage nodes 420 may store a source table for a secondary index stored at storage nodes 410. Propagation architecture under verification 430 may be the various nodes, protocols, and/or other operations used to propagate changes made to the source table at storage nodes 420 in accordance with the schema for the secondary index at storage node(s) 410.

As indicated at 412, propagation deployment management 229 may get items 412 from the secondary index at storage node(s) 410. For example, propagation deployment management 229 may scan, request individual items, or make batch item requests to storage nodes 410 in order to make a comparison with the source table at storage node(s) 420. For example, propagation deployment management 229 may take the items retrieved from the secondary index and issue get projected item requests 422 to obtain those items that are the source of the items in the secondary index from storage node(s) for the source table 420. In this way, a comparison may be performed to determine whether the content of secondary index is correct with respect to the source table.

Propagation deployment management 229 may generate and/or send a performance report 404. Performance report 404 may include various metrics concerning the accuracy or correctness of the secondary index. In some embodiments, a performance report may be a notification or other signal sent if an error is detected (and not sent if an error is not detected). In this way a recipient system, user, or operator can make adjustments or check for propagation architecture failures. In some embodiments, propagation deployment management 229 may take corrective actions in the event of identified errors, such as by sending various update item requests to storage nodes 410 to modify erroneous values, remove items, or add items.

Figure 5:
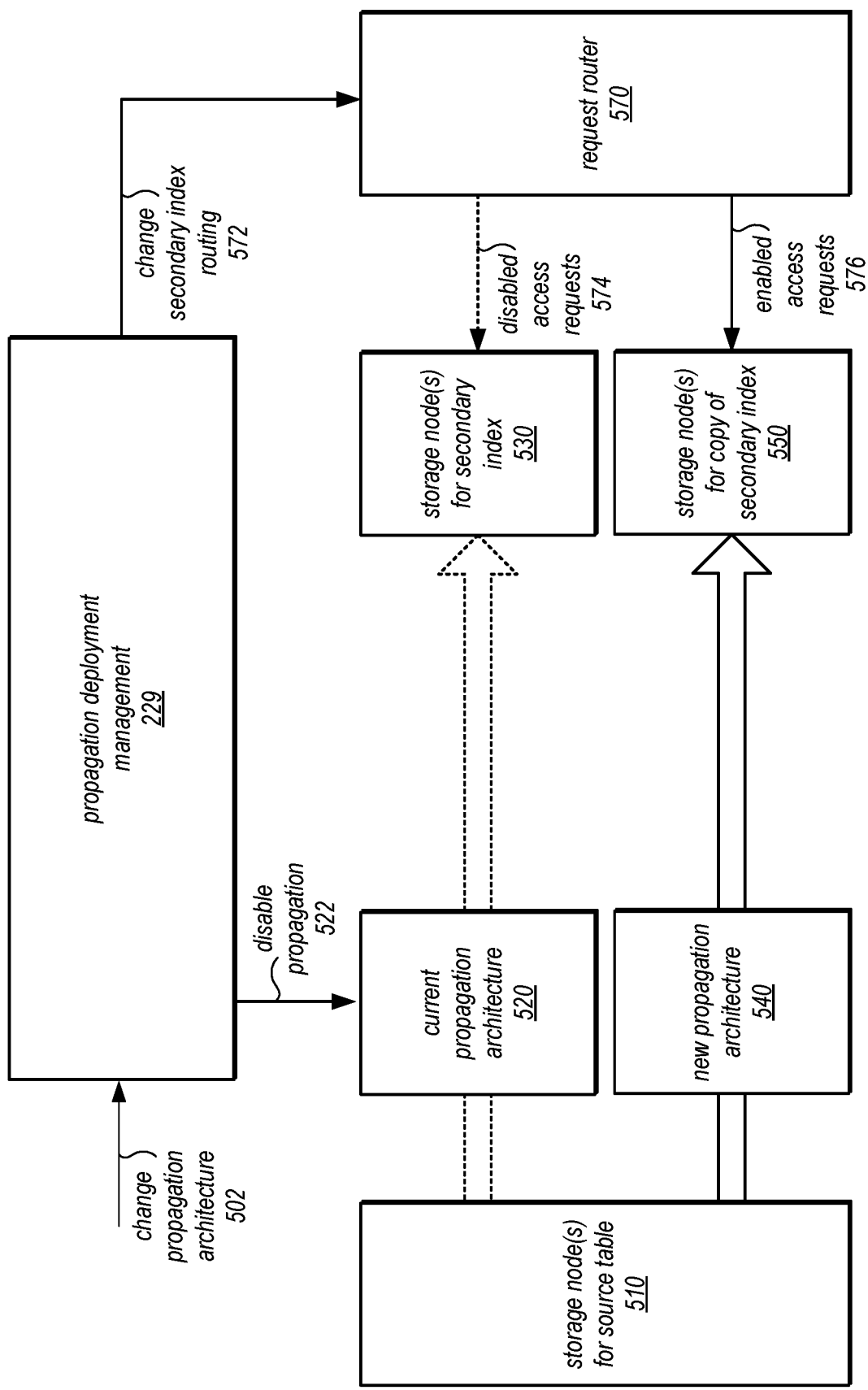
FIG. 5 is a logical block diagram illustrating example interactions to change a propagation architecture for a secondary index, according to some embodiments.

FIG. 5 is a logical block diagram illustrating example interactions to change a propagation architecture for a secondary index, according to some embodiments. As indicated at 502, a request to change propagation architecture may be received at propagation deployment management 229. Change request 502 may be received via an interface of database service 210, such as administrator console 226. In various embodiments, propagation management may implement a deployment technique that minimizes or eliminates secondary index downtime. For example, propagation deployment management 229 may change secondary index routing, as indicated at 572, notifying request router 570, similar to request routers 250 in FIG. 2 discussed above, of a switch from the secondary index at storage nodes 530 to a copy of the secondary index at storage nodes 550. Request router 570 may disable or otherwise stop sending access requests to storage nodes 530 for the secondary index, as indicated at 574. Instead, request router 570 may route access route access requests to storage nodes 550 for the copy of the secondary index using the new propagation architecture 540 to propagate updates from the source table at storage nodes 510. In this way, access may be enabled for the storage nodes storing the copy of the secondary index, as indicated at 576. In some embodiments, the enablement 576 and disablement 574 of access requests may be performed as an atomic operation (e.g., where both operations succeed and become visible, or neither operation succeeds and becomes visible).

Propagation deployment management 229 may disable, as indicated at 522, a current propagation architecture 520 that is propagating updates to a source table at storage nodes 510, to storage node(s) for a secondary index, as indicated at 530. In some embodiments, propagation through current architecture 520 may continue for a period of time after the switch to new propagation architecture and storage nodes 550, in order to provide a back-up copy of the secondary index at 530 (e.g., in the event of a failure). In some embodiments, propagation deployment management 229 may also cause storage to be deleted, released, returned, or otherwise made available at storage node(s) 530 to be used for other database service 210 data (e.g., other table or secondary index partitions).

Figure 6:
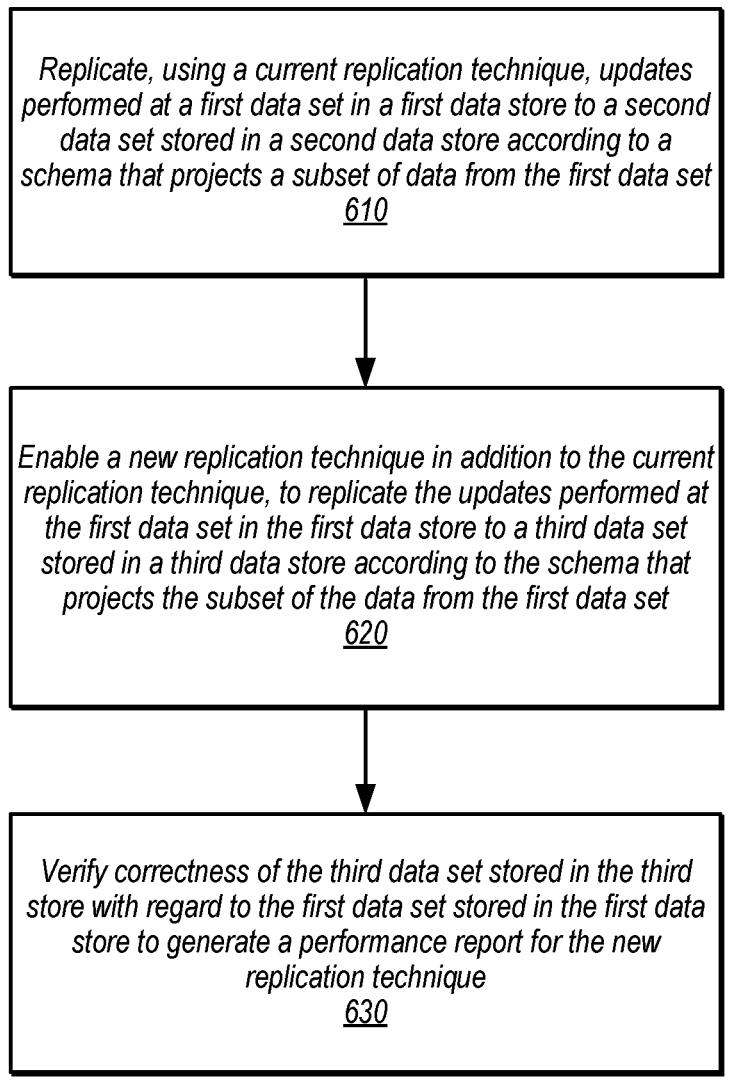
FIG. 6 is a high-level flowchart illustrating various methods and techniques to implement verifying performance of different replication techniques for data set projections, according to some embodiments.

The examples of a database that implements verifying performance of different replication techniques for data set projections as discussed in FIGS. 2-5 above have been given in regard to a database service (e.g., a relational database, a document database, a non-relational database, etc.). However, various other types of database systems or storage systems can advantageously implement verifying performance of different replication techniques for data set projections, in other embodiments. FIG. 6 is a high-level flowchart illustrating various methods and techniques to implement verifying performance of different replication techniques for data set projections, according to some embodiments. These techniques, as well as the techniques discussed with regard to FIGS. 7-8, may be implemented using components or systems as described above with regard to FIGS. 2-5, as well as other types of databases or storage systems, and thus the following discussion is not intended to be limiting as to the other types of systems that may implement the described techniques.

As indicated at 610, a current replication technique may be used to replicate updates performed at a first data store stored in a first data set to a second data set in a second data store according to a schema that projects a subset of data from the first data set, in some embodiments. As discussed above, a schema may define the arrangement or format of the subset of data (e.g., by identifying the ordering of items, attribute values to include, etc.). A replication technique may utilize different arrangements of nodes, protocols, and/or other operations to ensure replicated updates are passed and applied to a projected data subset according to the schema. In some embodiments, the current replication technique may have been selected for the subset, and in other embodiments, the current replication technique may be a default technique chosen without client input.

As indicated at 620, a new replication technique in addition to the current replication technique, may be enabled to replicate updates performed at the first data set in the first data store to a third data set stored in a third data store according to the schema that projects the subset of the data from the first data set, in some embodiments. For example, the new replication technique may implement a change to one (or more) of the arrangements of nodes, protocols, and/or other operations to ensure replicated updates are passed and applied to a projected data subset. The new replication technique may utilize separate computing resources (e.g., different nodes, network connections, backup copies, etc.) in order to avoid performance impacts on the current replication technique, in some embodiments. In some embodiments, different version numbers or other identifiers may be assigned to the different replication techniques in order to associate performance information (as discussed below) with a corresponding replication technique.

Although different in implementation, the new replication technique may be applying the same schema for the subset of the data set as the current replication technique, and thus result of the current and new replication techniques may be the same. As indicated at 630, correctness of the third data set stored in the third data store may be verified with regard to the first data set stored in the first data store to generate a performance report for the new replication technique, in various embodiments. For example, a comparison of values between the second data store and the third data store may be performed, where the second data store acts as the "truth" for detecting errors, where a value in the third data store that does not match the truth value in the second data store is identified as an erroneous value. In a similar example, a comparison of values between the first data store and the third data store may be performed, where the first data store acts as the "truth" for detecting errors. In some embodiments, update logs or other records of changes may be evaluated or analyzed to determine the existence of errors in the third data set at the third data store.

A performance report may include specific errors (e.g., erroneous values and the "correct values"), in some embodiments. In some embodiments, the performance report may include performance measures (e.g., 98% accurate, average latency or lag between performance of update at first data store and third data store, etc.). In some embodiments, the performance report may only be generated if an error is detected, and in other embodiments, a performance report may be provided to provide non-error related measures (e.g., latency) even if an error is not detected. In some embodiments, the performance report may be an alarm or other event that triggers warnings, alerts, and/or corrective actions. For example, a deployment system, monitoring system, or other component of a distributed data store that utilizes replication techniques may take corrective actions to update, add, or remove items in the third data set to correct the third data set. In some embodiments, performance reports may be tracked or maintained over a period of time before trigger a change or replacement workflow that automatically changes replication from the current technique to a new technique, as discussed above with regard to FIG. 5 and below with regard to FIG. 7.

Figure 7:
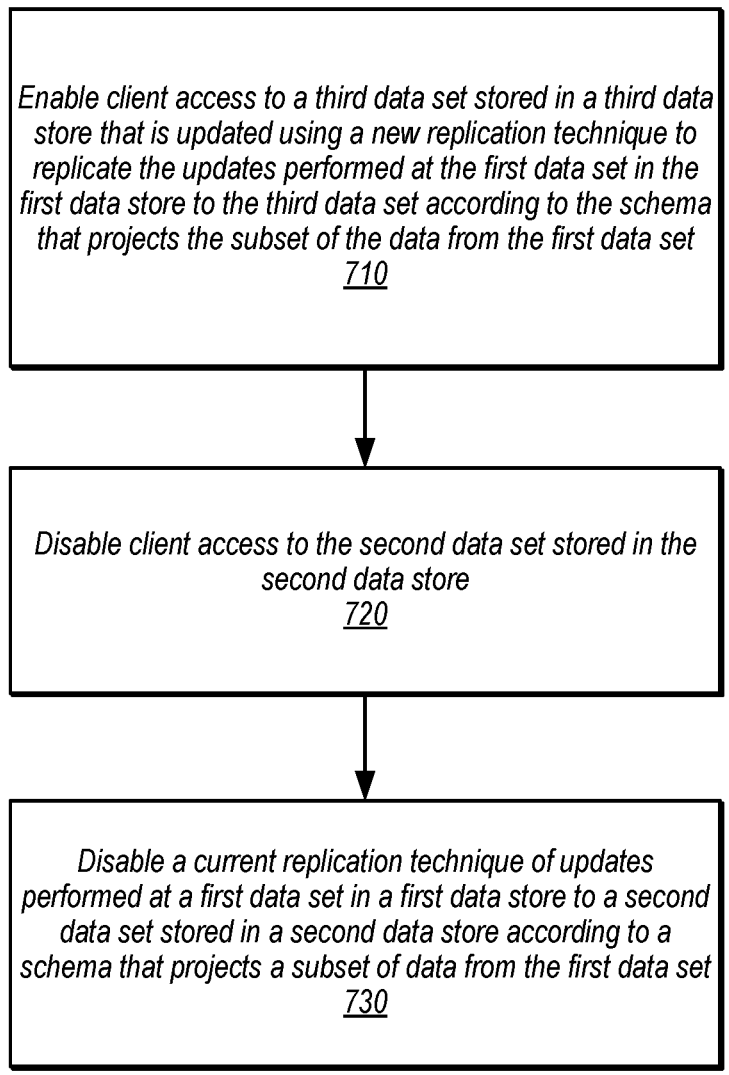
FIG. 7 is a high-level flowchart illustrating various methods and techniques to change replication techniques for data set projections, according to some embodiments.

FIG. 7 is a high-level flowchart illustrating various methods and techniques to change replication techniques for data set projections, according to some embodiments. s indicated at 710, client access to a third data set stored in a third data store that is updated using a new replication technique to replicate the updates performed at the first data set in the first data store to the third data set according to the schema that projects the subset of the data from the first data set is enabled, in some embodiments. As indicated at 720, client access to the second data set stored in the second data store may be disabled, in some embodiments. In at least some embodiments, elements 710 and 720 may be performed together (e.g., utilizing an atomic operation to update routing information in a request router, as discussed above with regard to FIG. 5). In other embodiments, some overlap in requests to access the subset of data may be allowed to go to either (or both) the second data store and the third data store.

As indicated at 730, a current replication technique of updates performed at a first data set in a first data store to a second data set stored in a second data store according to a schema that projects a subset of data from the first data set may be disabled, in some embodiments. For example, various computing resources used to implement the current replication technique may be disabled or reassigned to other distributed data store work. In some embodiments, the current replication technique may be performed for a period of time after client access to the second data set in the second data store is disabled in order to retain a backup copy of the subset of data.

As discussed above with regard to FIG. 3, a partition geometry (e.g., a description of different boundaries for partitions of a larger data set) may be used to identify how to place different partitions of a data set, such as a projected subset of data (e.g., a secondary index) can be placed when creating a new copy of the projected subset (e.g., creating a new copy of the secondary index to verify performance of a new replication technique to the new copy of the secondary index). While some approaches to determining the partition geometry may include reusing a partition geometry of an existing copy of the subset (e.g., an existing secondary index), an optimized determination of partition geometry may improve the performance of creating the new copy of the subset which can, among other performance benefits, reduce the impact of testing new replication techniques by reducing the impact of making new copies of the subset of the data set. For example, as discussed above with regard to FIG. 2, different merge and split operations may be performed to manage the workload in individual storage nodes. If a partition geometry is determined that minimizes the occurrence of such events, then the computing resources used to create the copy of the subset can be minimized overall.

Figure 8:
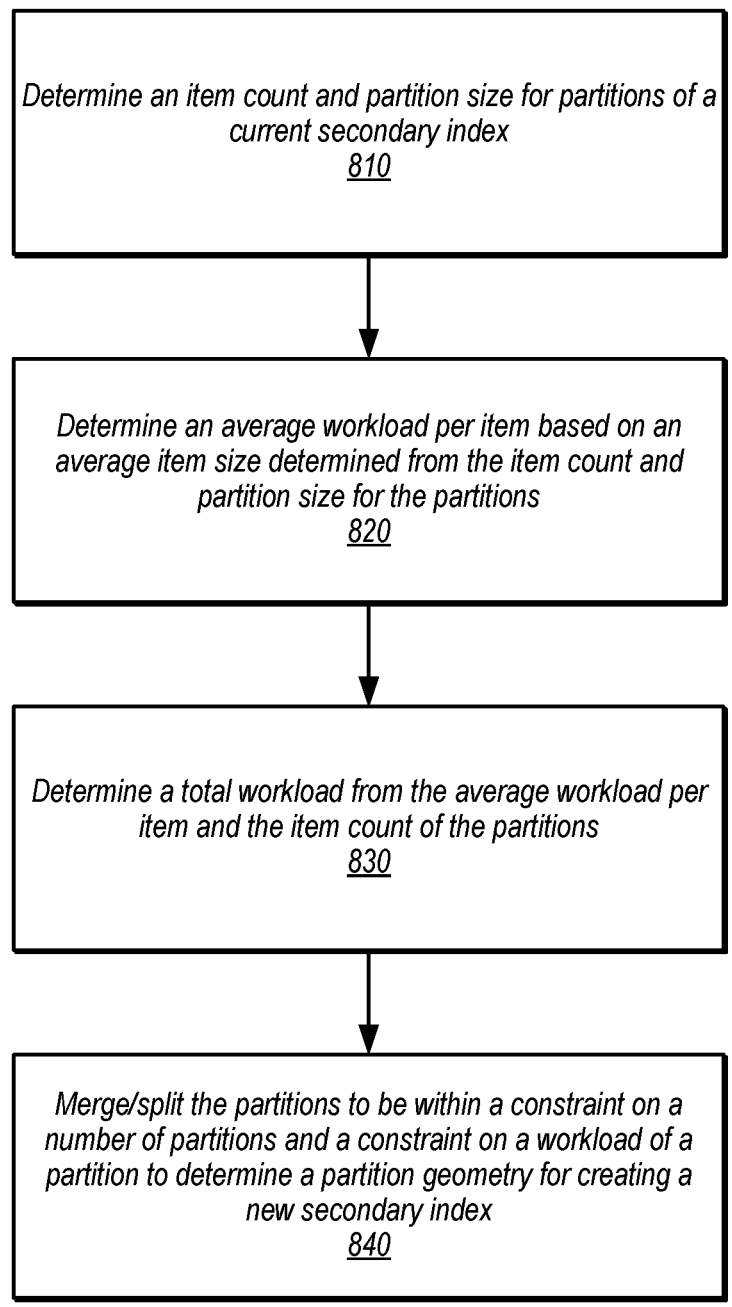
FIG. 8 is a high-level flowchart illustrating various methods and techniques to implement determining a partition geometry for creating a secondary index, according to some embodiments.

FIG. 8 is a high-level flowchart illustrating various methods and techniques to implement determining a partition geometry for creating a secondary index, according to some embodiments. As indicated at 810, an item count and partition size may be determined for partitions of a current secondary index, in various embodiments. For example, partition sizes and numbers of items of the current secondary index may be obtained from the different storage nodes that store the partitions of the current secondary index in response to a request from an index creation component (e.g., index creation management 222 of FIG. 2).

As indicated at 820, an average workload per item may be determined based on an average item size determined from the item count and partition size for the partitions, in some embodiments. For example, the average item size per partition may be determined, by dividing a partition size by the number of items in the partition (e.g., 675 KB (partition size)/10 (number of items in the partition)=65.7 KB average item size). The average item size may then be used as a proxy or indication of work to create the partition such that the average workload is equivalent to (or determined from) the average item size (e.g., a workload unit value may be 1 KB to 1 workload unit). As indicated at 830, a total workload for the partition may then be determined from the average workload per item and the item count of the partitions, in some embodiments. For example, the item count of the partitions may be multiplied by the average workload per item to be the total workload.

As indicated at 840, a number merges and/or splits of the partitions may be performed to be within a constraint on a number of partitions and a constraint on a workload of a partition to determine a partition geometry for creating a new secondary index, in some embodiments. For example, different partition sizes may be created from a baseline partition geometry (e.g., the partition geometry of a current secondary index) by merging or splitting the partitions so that a workload value for a partition (e.g., as determined by the number of items in the partition and the workload per item) does not exceed a workload threshold (e.g., which would trigger a workload management operation in the distributed data store system, slowing down the creation process). Consider a scenario where the workloads of two partitions were to be merged. If the workload for that combined partition does not exceed the workload threshold, then the combination may be retained. Similarly, a current partition may already have a workload above the workload threshold, and thus a split to divide the partition into two different partitions that have workloads below the threshold may be performed. Different search or evaluation techniques may be used to examine the different partition combinations in some embodiments within the constraints of the number of partitions and the workload allowed on a partition, in different embodiments.

The methods described herein may in various embodiments be implemented by any combination of hardware and software. For example, in some embodiments, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
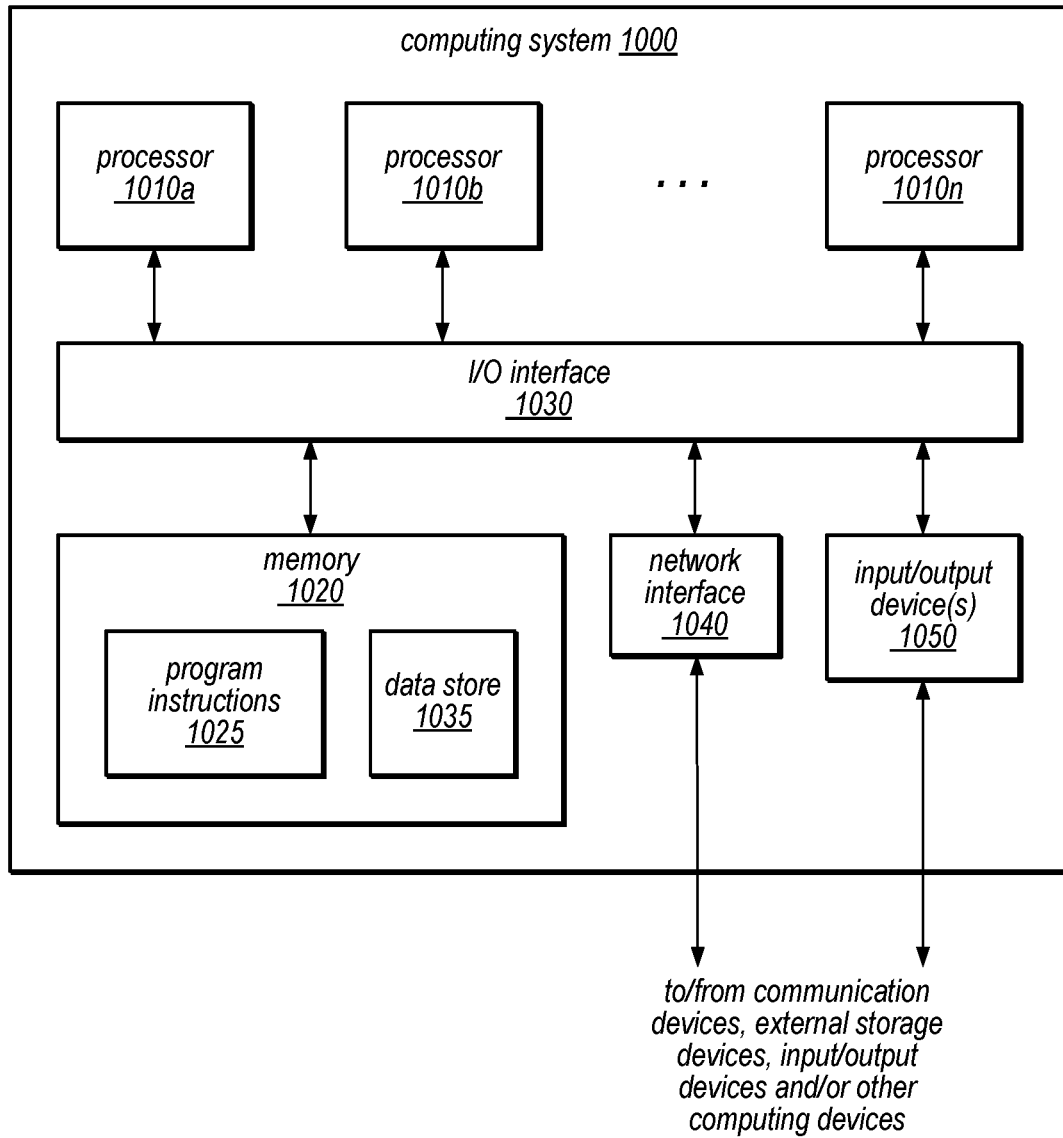
FIG. 9 is a block diagram illustrating an example computing system, according to some embodiments.

Embodiments to implement verifying performance of different replication techniques for data set projections offline builds for projected data subsets as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement propagation deployment management for a database service, the propagation deployment management configured to:

identify a new replication technique to deploy in addition to a current replication technique to replicate updates first performed on a database table stored in a first data store to a secondary index stored at a second data store according to a schema that projects a subset of data from the database table, wherein the new replication technique applies the same schema as the current replication technique such that a result of the current replication technique and the new replication techniques is the same, wherein the secondary index is accessible to a client of the database service;

cause the new replication technique to be enabled to replicate the updates first performed on the database table in the first data store to a copy of the secondary index stored in a third data store according to the schema that projects the subset of the data from the datable, wherein the copy of the secondary index is not accessible to the client of the database service;

after causing the new replication technique to be enabled to replicate the updates, verify correctness of the copy of the secondary index stored in the third store by accessing the database table stored in the first data store to compare respective values of the copy of the secondary index and the database table to determine whether errors exist in the copy of the secondary index, wherein the verification of the correctness of the third data set stored in the third store with regard to the first data set stored in the first data store is continuously performed responsive to a request that enabled the verification;

generate a performance report for the new replication technique based on the comparison of the respective values of the copy of the secondary index and the table to determine whether errors exist in the copy of the secondary index; and send the performance report to an identified recipient.

2. The system of claim 1, wherein the propagation deployment manager is further configured to:

enable client access to the copy of the secondary index and disable client access to the secondary index using an atomic operation; and disable the current replication technique of updates to the secondary index.

3. The system of claim 1, wherein the copy of the secondary index is created using a partition geometry determined for storing different respective partitions of the copy of the secondary index across different storage nodes from respective partitions of the secondary index.

4. The system of claim 1, wherein the database service is a non-relational database service, wherein the secondary index is a global secondary index, and wherein the copy of the secondary index is a copy of the global secondary index.

5. A method, comprising:

replicating, using a current replication technique, updates performed at a first data set in a first data store to a second data set stored in a second data store according to a schema that projects a subset of data from the first data set, wherein the first data store and the second data store are implemented as part of one or more services of a provider network;

enabling a new replication technique in addition to the current replication technique, to replicate the updates performed at the first data set in the first data store to a third data set stored in a third data store according to the schema that projects the subset of the data from the first data set, wherein the new replication technique applies the same schema as the current replication technique such that a result of the current replication technique and the new replication techniques is the same;

after enabling the new replication technique to replicate the updates, verifying correctness of the third data set stored in the third store by accessing the first data set stored in the first data store to compare respective values of the third data set and the first data set to determine whether errors exist in the copy of the secondary index, wherein verifying the correctness of the third data set stored in the third store with regard to the first data set stored in the first data store is continuously performed responsive to a request that enabled the verifying; and generating a performance report for the new replication technique based on the comparison of the respective values of the third data set and the first data set to determine whether errors exist in the copy of the secondary index.

6. The method of claim 5, wherein verifying the correctness of the third data set stored in the third store with regard to the first data set stored in the first data store is performed in response to a request to perform the verifying.

7. The method of claim 5, further comprising:

enabling client access to the third data set of the third data store;

disabling client access to the second data set of the second data store; and disabling the current replication technique of updates to the second data set of the second data store.

8. The method of claim 7, further comprising deleting the second data set of the second data store after disabling the current replication technique of updates to the second data set of the second data store.

9. The method of claim 5, wherein the third data set is created using a partition geometry determined for storing different respective partitions of the third data set across different storage nodes from respective partitions of the second data set.

10. The method of claim 9, wherein, in determining the partition geometry, the program instructions cause the one or more computing devices to implement:

determining an item count and partition size for the partitions of the second data set;

determining an average workload per item based on an average item size determined from the item count and partition size for the partitions;

determining a total workload from the average workload per item and the item count of the partitions; and performing one or more merge or split operations on the partitions of the second data set to be within a constraint on a number of partitions and a constraint on a workload of a partition to determine the different respective partitions of the partition geometry.

11. The method of claim 5, wherein verifying the correctness of the third data set stored in the third store with regard to the first data set stored in the first data store is continuously performed responsive to a request that enabled the verifying.

12. The method of claim 5, wherein the second data set of the second data store is client accessible and wherein the third data set of the third data store is not client accessible.

13. The method of claim 5, further comprising correcting one or more errors identified in the performance report.

14. One or more non-transitory, computer-readable storage media, storing program instructions that when executed on or across one or more computing devices cause the one or more computing devices to implement deployment management as part of a service offered by a provider network, wherein the deployment management implements:
- identifying a new replication technique to deploy in addition to a current replication technique to replicate updates first performed at a first data set in a first data store to a second data set stored in a second data store according to a schema that projects a subset of data from the first data set
- causing the new replication technique to be enabled to replicate the updates first performed at the first data set in the first data store to a third data set stored in a third data store according to the schema that projects the subset of the data from the first data set, wherein the new replication technique applies the same schema as the current replication technique such that a result of the current replication technique and the new replication techniques is the same; and
- after causing the new replication technique to be enabled to replicate the updates, verifying correctness of the third data set stored in the third store by accessing the first data set stored in the first data store to compare respective values of the third data set and the first data set to determine whether errors exist in the copy of the secondary index, wherein verifying the correctness of the third data set stored in the third store with regard to the first data set stored in the first data store is continuously performed responsive to a request that enabled the verifying;
- generating a performance report for the new replication technique based on the comparison of the respective values of the third data set and the first data set to determine whether errors exist in the copy of the secondary index.

15. The one or more non-transitory, computer-readable storage media of claim 14, storing further instructions that when executed on or across the one or more computing devices, cause the one or more computing devices to further implement:
- disabling client access to the second data set of the second data store;
- disabling the current replication technique of updates to the second data set of the second data store; and
- enabling client access to the third data set of the third data store.

16. The one or more non-transitory, computer-readable storage media of claim 14, wherein the third data set is created using a partition geometry determined for storing different respective partitions of the third data set across different storage nodes from respective partitions of the second data set.

17. The one or more non-transitory, computer-readable storage media of claim 16, wherein, in determining the partition geometry, the program instructions cause the one or more computing devices to implement:
- determining an item count and partition size for the partitions of the second data set;
- determining an average workload per item based on an average item size determined from the item count and partition size for the partitions;
- determining a total workload from the average workload per item and the item count of the partitions; and
- performing one or more merge or split operations on the partitions of the second data set to be within a constraint on a number of partitions and a constraint on a workload of a partition to determine the different respective partitions of the partition geometry.

18. The one or more non-transitory, computer-readable storage media of claim 14, wherein the performance report indicates an error in the third data set, and wherein the performance report is sent to an identified recipient.

19. The one or more non-transitory, computer-readable storage media of claim 14, wherein the first data set is a database table hosted by a database service of a provider network, wherein the second data set is a global secondary index hosted by the database service, and wherein the third data set is a copy of the global secondary index hosted by the database service.

\* \* \* \* \*